(12) United States Patent
Broadhead

(10) Patent No.: US 8,136,866 B2
(45) Date of Patent: Mar. 20, 2012

(54) INNER PANEL FOR A DOOR ASSEMBLY HAVING AN INTEGRATED INTRUSION BEAM

(75) Inventor: Douglas G. Broadhead, Brampton (CA)

(73) Assignee: Magna Closures Inc., Newmarket (CA)

( * ) Notice: Subject to any disclaimer, the term of this patent is extended or adjusted under 35 U.S.C. 154(b) by 310 days.

(21) Appl. No.: 12/300,246

(22) PCT Filed: May 10, 2007

(86) PCT No.: PCT/CA2007/000808
§ 371 (c)(1),
(2), (4) Date: Nov. 10, 2008

(87) PCT Pub. No.: WO2007/131332
PCT Pub. Date: Nov. 22, 2007

(65) Prior Publication Data
US 2009/0146451 A1    Jun. 11, 2009

(51) Int. Cl.
*B60J 5/04*    (2006.01)
(52) U.S. Cl. .................................................. 296/146.2
(58) Field of Classification Search ............... 296/146.2, 296/146.5, 146.6, 146.7; 49/502
See application file for complete search history.

(56) References Cited

U.S. PATENT DOCUMENTS

| | | | |
|---|---|---|---|
| 4,845,894 A * | 7/1989 | Herringshaw et al. | 49/502 |
| 6,302,472 B1 * | 10/2001 | Rahmstorf et al. | 296/146.5 |
| 6,805,397 B1 | 10/2004 | Chernoff et al. | |
| 7,040,688 B2 | 5/2006 | White et al. | |
| 7,231,717 B2 * | 6/2007 | Wurm et al. | 29/897.2 |
| 7,347,026 B1 * | 3/2008 | Garcia et al. | 49/502 |
| 7,712,809 B2 * | 5/2010 | Lynam et al. | 296/1.11 |
| 7,774,986 B2 * | 8/2010 | Unterreiner et al. | 49/502 |
| 2002/0134025 A1 * | 9/2002 | Lawrie et al. | 49/502 |
| 2004/0216386 A1 | 11/2004 | Chernoff et al. | |
| 2005/0134091 A1 | 6/2005 | Rashidy et al. | |
| 2005/0225115 A1 | 10/2005 | Wallstrom et al. | |
| 2006/0290166 A1 | 12/2006 | Gehringhoff et al. | |
| 2007/0039245 A1 | 2/2007 | Buchta et al. | |
| 2007/0102955 A1 | 5/2007 | Bodin et al. | |

FOREIGN PATENT DOCUMENTS

| | | |
|---|---|---|
| DE | 19519509 | 12/1995 |
| EP | 0727330 | 8/1996 |
| JP | 03-045421 | 2/1991 |
| WO | WO2006103519 A2 | 10/2006 |

* cited by examiner

*Primary Examiner* — Hilary Gutman
(74) *Attorney, Agent, or Firm* — Miller Canfield

(57) ABSTRACT

A door assembly is provided that includes integral impact regions that obviate the need for a separate impact beam. The door assembly includes an outer panel and an inner panel, operably connected to the outer panel so that a compartment is formed therebetween. At least one hardware-mounting surface is integrally formed from the inner panel and extends towards the outer panel. Each of the hardware mounting surfaces is operable to mount a hardware component between the inner and outer panels. At least one integrally-formed impact region is provided on the inner panel that is operable to strengthen the door assembly and increase its intrusion resistance of the vehicle door during a collision. The inner panel has substantially no large access openings that would be deleterious to impact resistance and substantially seals the vehicle passenger compartment from the external environment. The at least one impact region is also displaced at least as far away from the outer panel as the at least one hardware mounting surface.

13 Claims, 9 Drawing Sheets

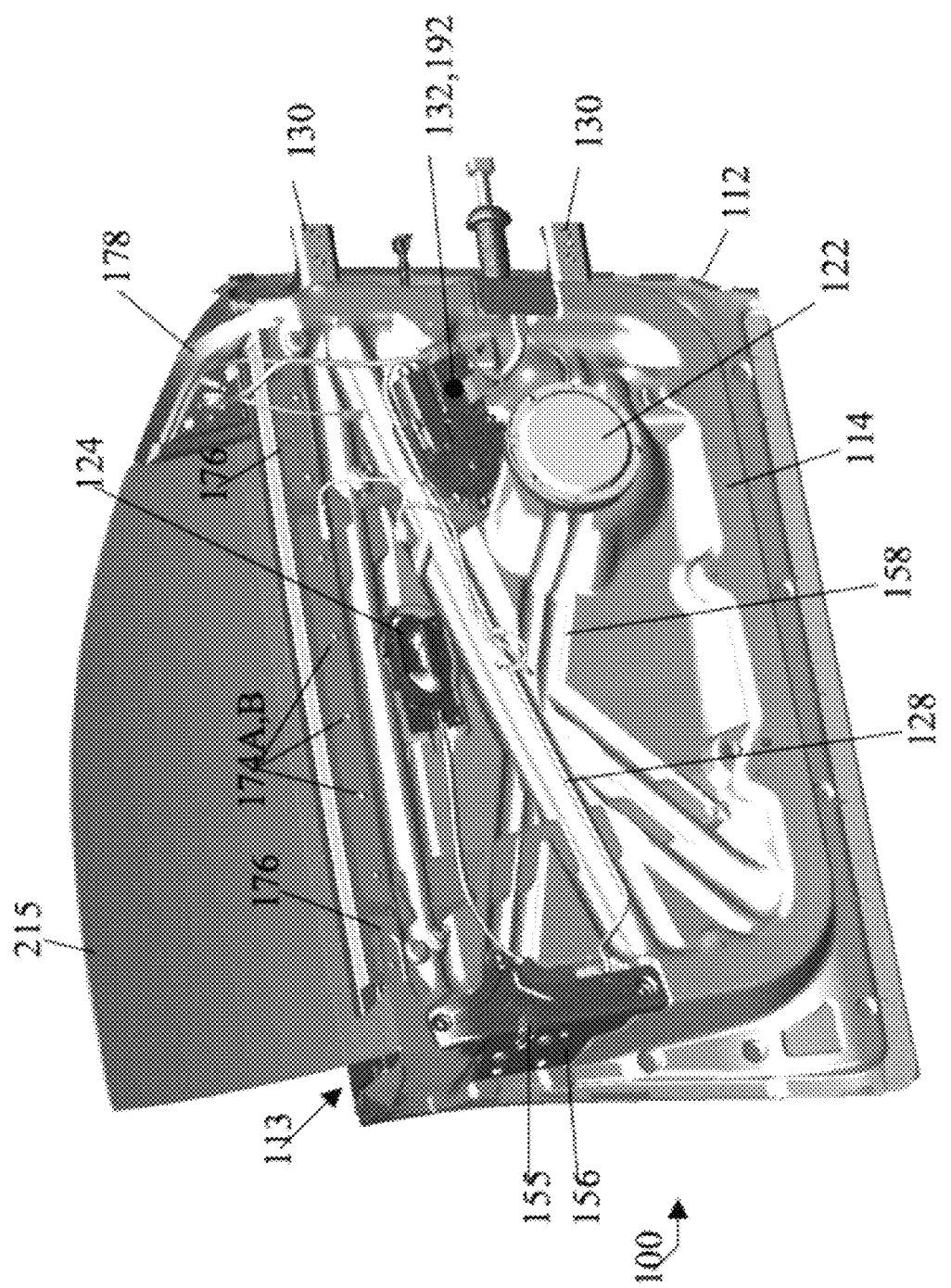

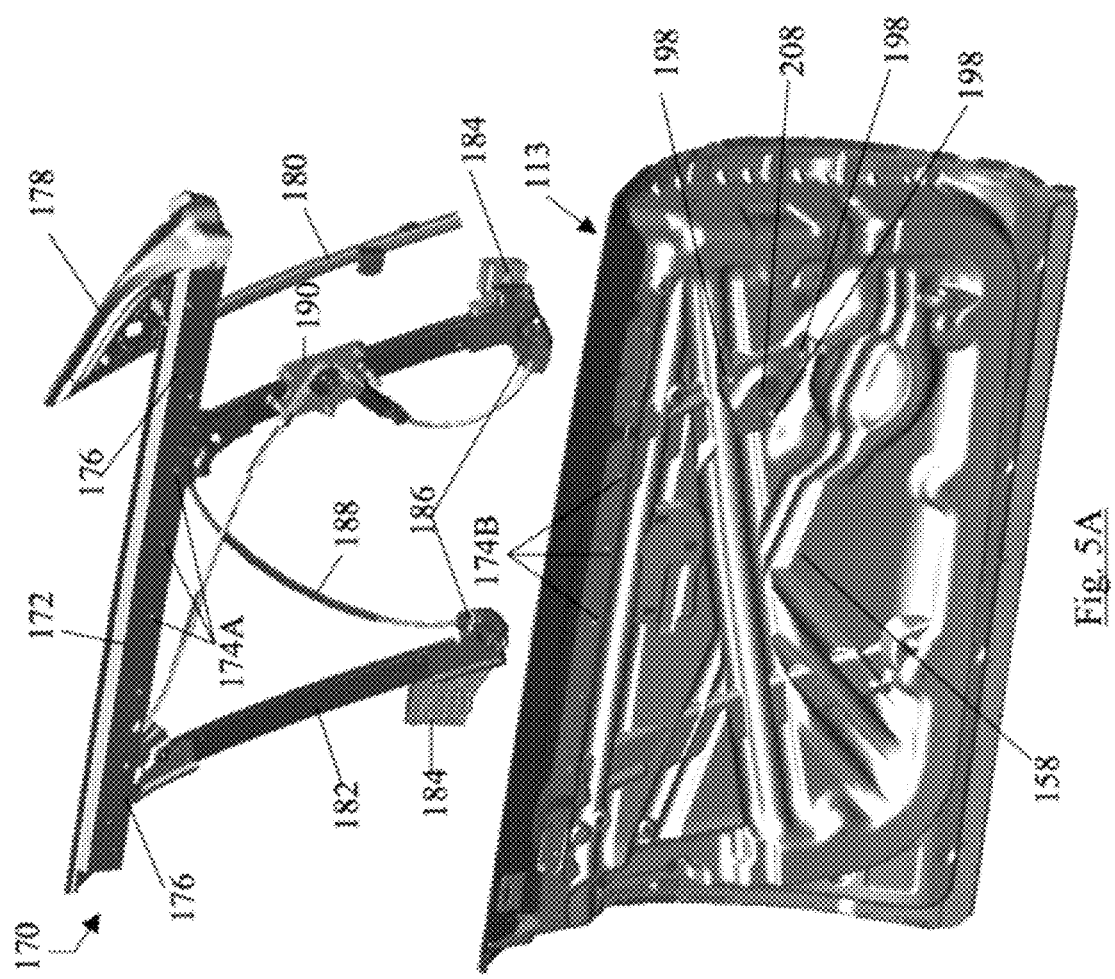

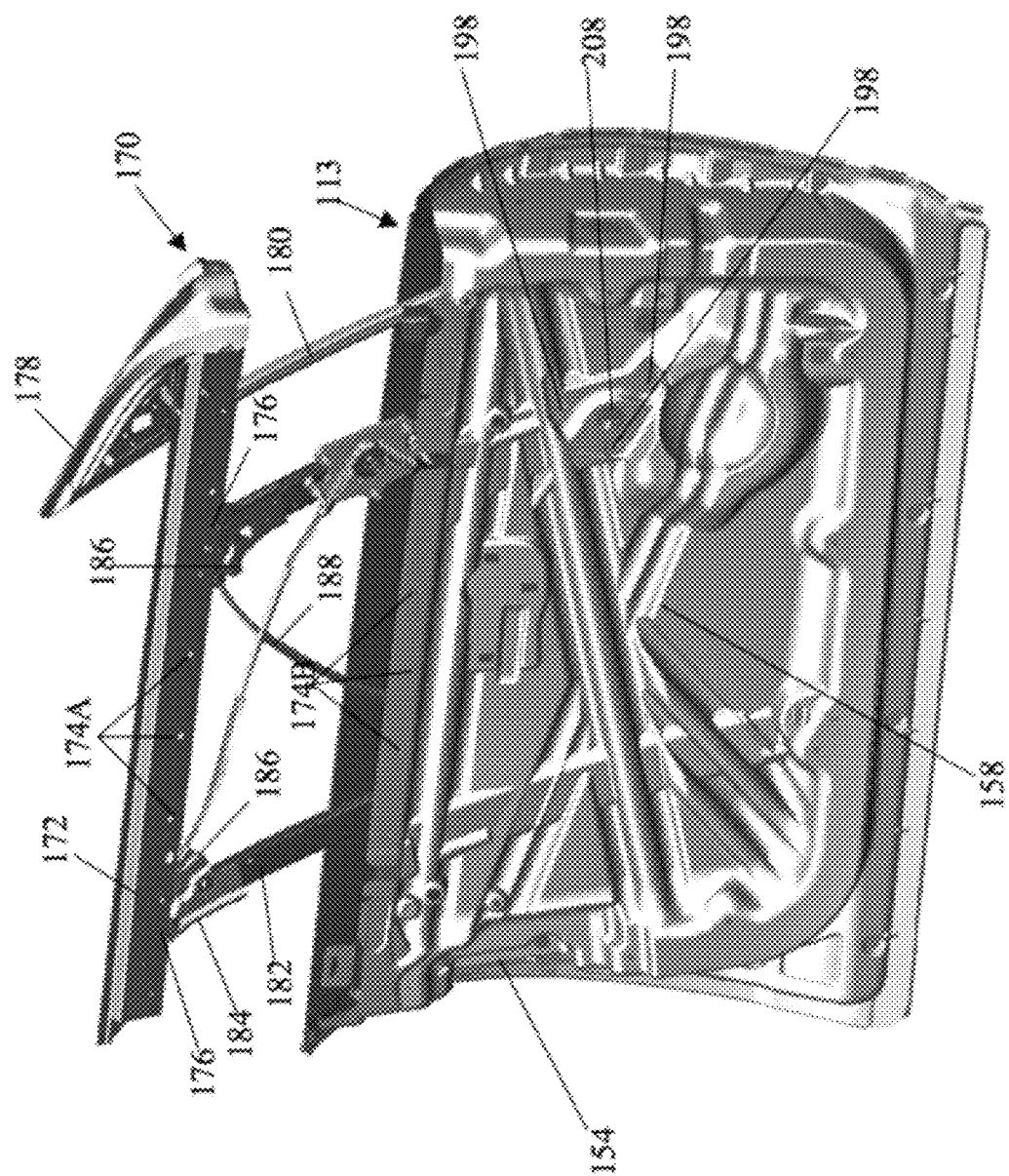

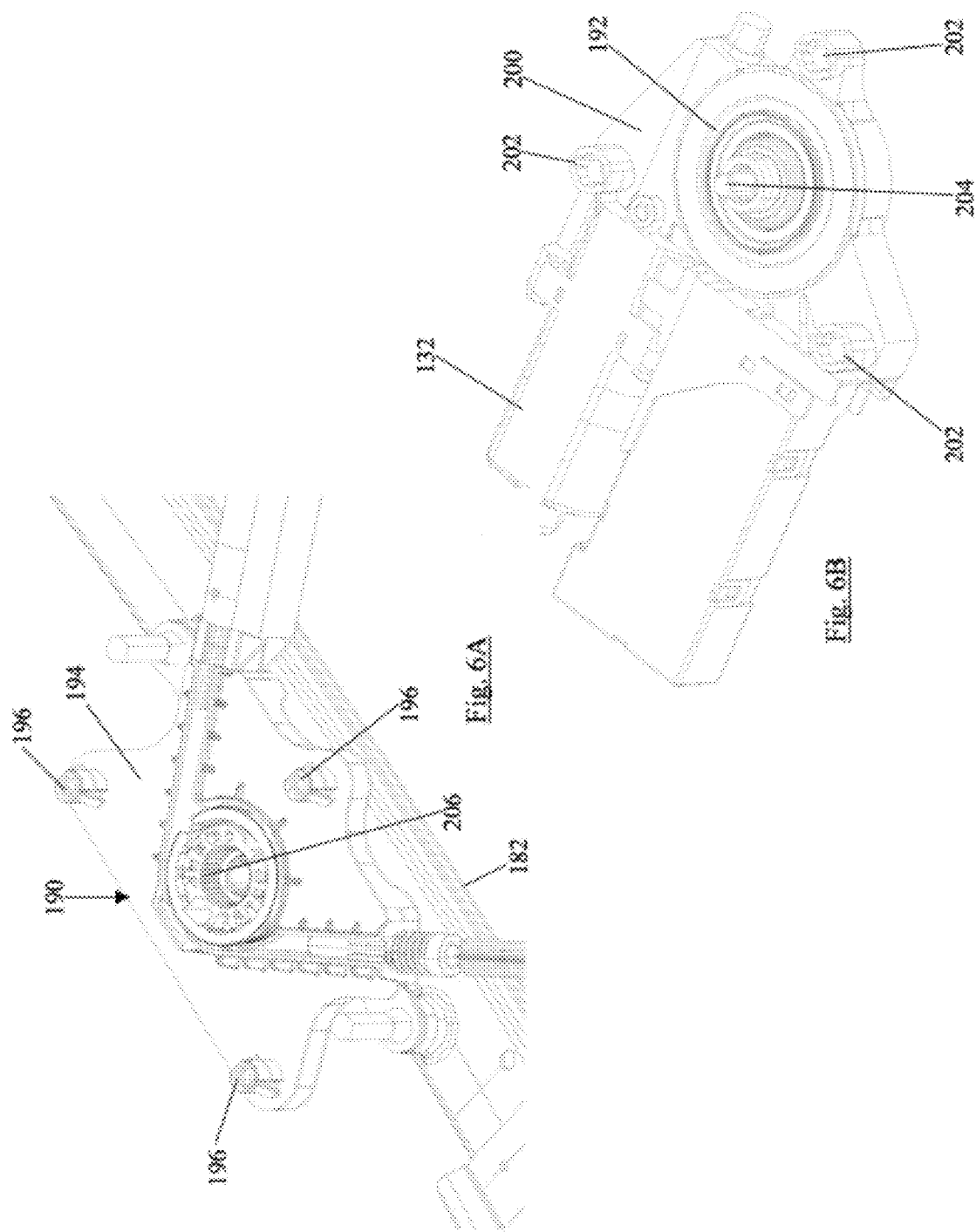

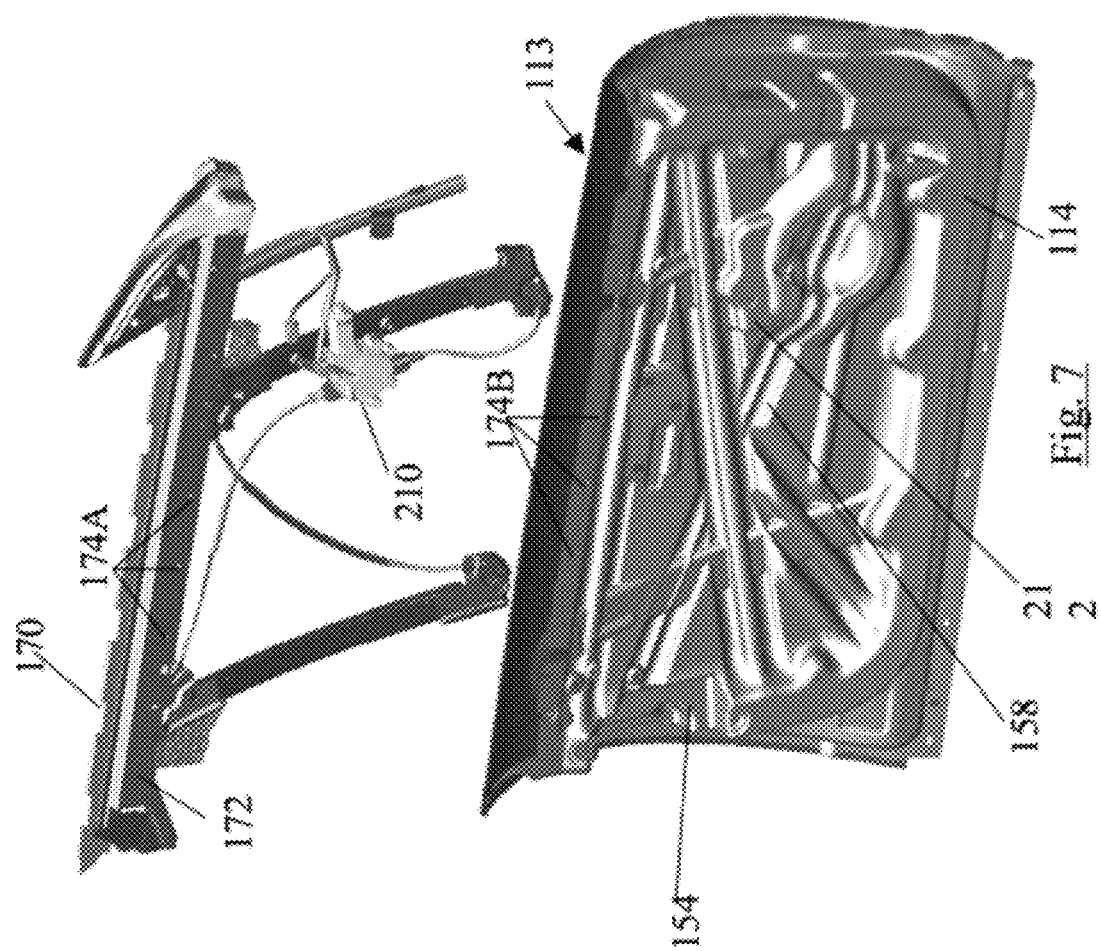

INNER PANEL FOR A DOOR ASSEMBLY HAVING AN INTEGRATED INTRUSION BEAM

FIELD OF THE INVENTION

The present invention relates to a module for a motor vehicle door body. More particularly, the present invention relates to a structural module that both strengthens the motor vehicle door body, reduces the packaging size of the door and acts as a hardware carrier for hardware subsystems in order to minimize subsequent assembly operations.

BACKGROUND OF THE INVENTION

A motor vehicle door typically includes an outer sheet metal panel and an inner sheet metal panel connected together to form a cavity therebetween. An equipment module is often mounted to the inner sheet metal panel within the cavity. In addition, an impact beam is typically welded to the inner sheet panel to resist deformation of the door during a side impact collision. The use of equipment modules and side impact beams increases the thickness of the door, and can increase assembly costs of the vehicle door.

U.S. Pat. No. 7,040,688 to White and Chernoff, incorporated by reference herein, discloses the use of an inner door panel having an integrated impact beam. The inner panel is formed to include corrugated regions that extend convexly outwards from its wet side surface (i.e., facing towards the exterior of the vehicle). The corrugated regions provide sufficient intrusion resistance to obviate the need for an additional impact beam. To accommodate equipment mounted to the wet side surface of the inner panel (such as the rails to the window regulator), interruptions in the corrugated regions are provided.

While the above-noted inner door panel disclosed by White and Chernoff improves the strength and reduces the thickness of the door assembly relative to a conventional vehicle door, it is not without its drawbacks.

First, the corrugated regions of the integrated impact beam are limited in their size and geometry as to accommodate wet-side mounted equipment, such as providing space between the outer sheet metal and the panel for the travel of the window glass. Furthermore, the corrugated regions must be spaced apart from the outer panel as to allow free travel of the window glass.

Second, the inner panel has a large hole in it to accommodate the window regulator drive assembly. This has a deleterious effect on the structural integrity of the inner door panel, causing the design to use many more corrugations to achieve a particular side impact resistance. In addition, despite the large access hole for the window regulator motor assembly, the door assembly does readily enable certain door hardware such as the window regulator subsystem to be installed on a high speed manufacturing line. Moreover, the White and Chernoff inner panel must still be sealed to prevent moisture and road dirt from entering the passenger cabin.

It is thus desirable to provide a door assembly that includes an inner door panel that provides a high level of intrusion resistance but still allows for hardware components to be easily mounted while minimizing the thickness of the door assembly.

SUMMARY OF THE INVENTION

According to one aspect of the invention, an inner panel having an integrated impact beam is provided for a motor vehicle door assembly, wherein the inner panel substantially seals the motor vehicle passenger cabin from the external environment.

According to another aspect of the invention, an inner panel having an integrated impact beam is provided for a motor vehicle door assembly, wherein a latch is mounted within a cavity on a dry side of the inner panel, facing the passenger cabin.

According to yet another aspect of the invention, there is provided a door assembly that includes integral impact resistant regions. The door assembly includes an outer panel and an inner panel, operably connected to the outer panel so that a cavity is formed therebetween. At least one hardware mounting surface is integrally formed from the inner panel and extends towards the outer panel. Each of the hardware mounting surfaces is operable to mount a hardware component between the inner and outer panels. At least one integrally-formed impact region is provided on the inner panel that is operable to strengthen the door assembly and increase its intrusion resistance of the vehicle door during a collision. The at least one impact region is displaced at least as far away from the outer panel as the at least one hardware mounting surface.

BRIEF DESCRIPTION OF THE DRAWINGS

Preferred embodiments of the present invention will now be described, by way of example only, with reference to the attached Figures, wherein:

FIGS. 4A and 4B are perspective views of a door assembly (without trim) according to a second embodiment of the invention, FIG. 4A showing the dry side of the inner panel and FIG. 4B showing the wet side of the inner panel;

FIGS. 5A and 5B are partially exploded views of the second embodiment showing a hardware carrier which is insertable in the compartment between the inner and outer door panels;

FIGS. 6A and 6B are detail views of a window regulator motor assembly employed by the second embodiment; and FIG. 7 is a partially exploded view of a door assembly according to a third embodiment, showing a variant of the hardware carrier which is insertable in the compartment between the inner and outer door panels.

DETAILED DESCRIPTION OF THE PREFERRED EMBODIMENTS

Figure 1A:
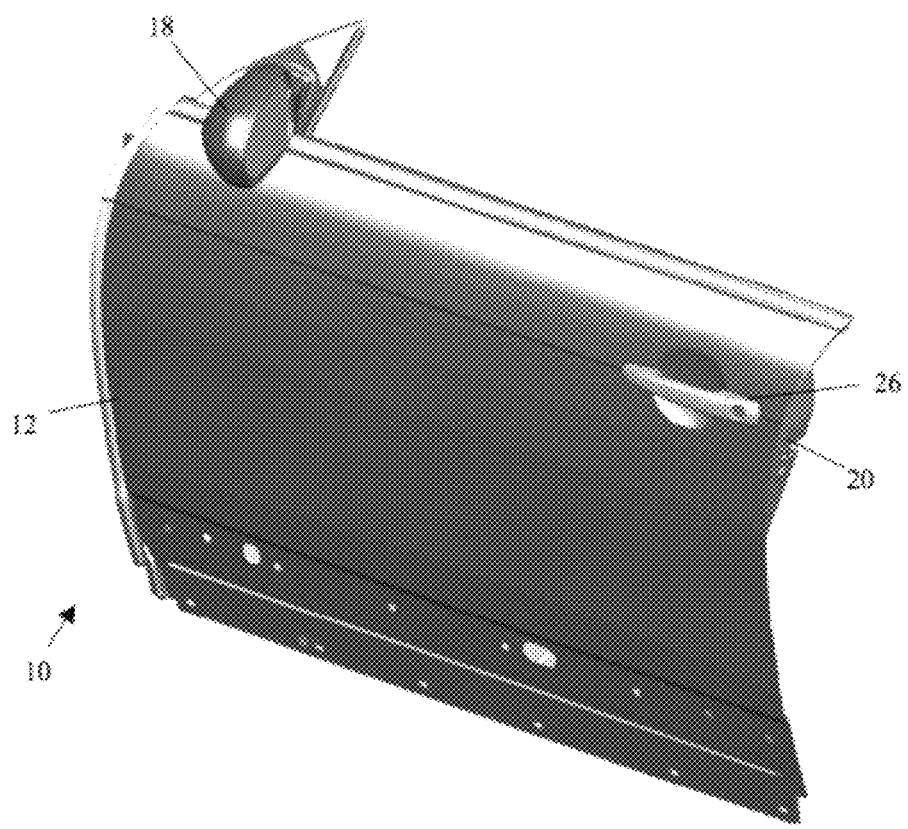
FIGS. 1A and 1B are perspective views of a door assembly according to a first embodiment of the invention.
Figure 1B:
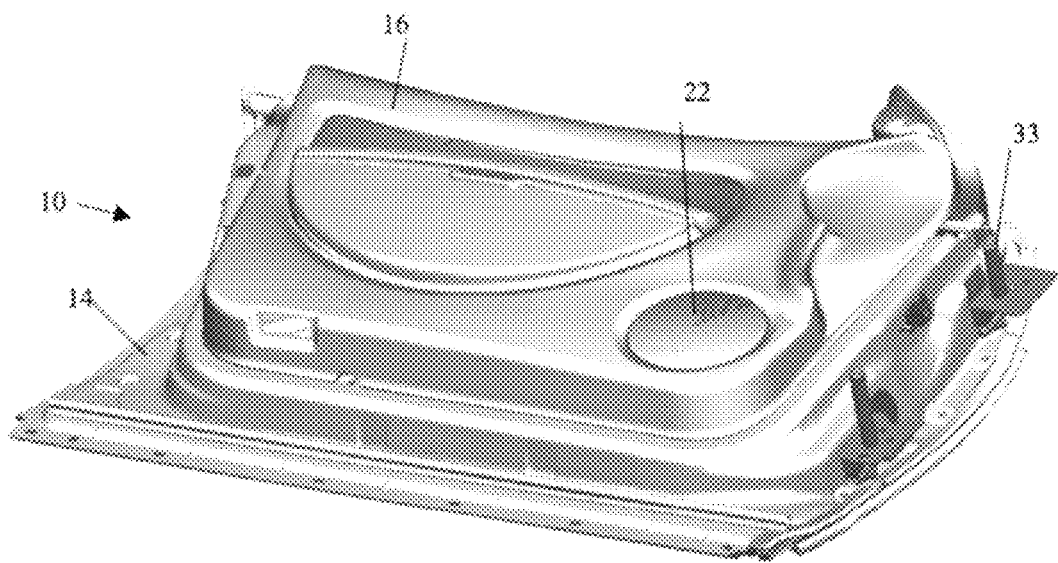
Figure 2:
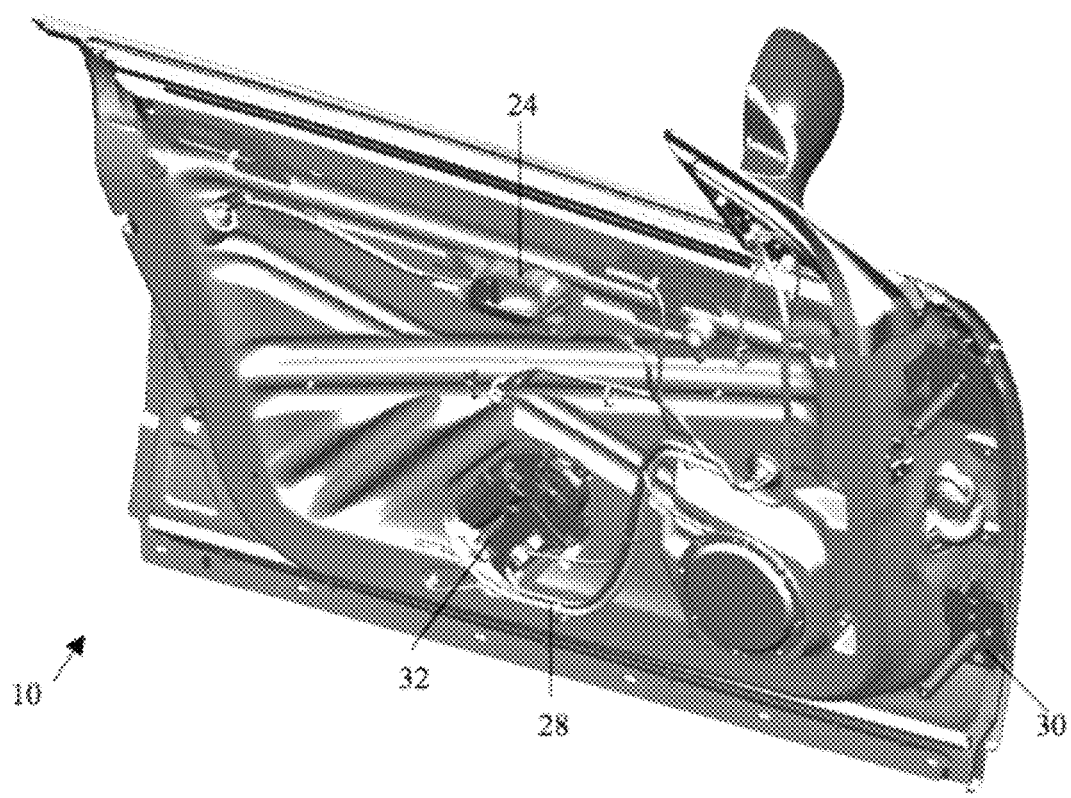
FIG. 2 is a perspective view of the door assembly shown in FIGS. 1A and 1B with a trim component removed.

Referring now to FIGS. 1A, 1B and 2, a first embodiment of a door assembly is shown generally at 10. Door assembly 10 includes an exterior-facing "wet side" (FIG. 1A) and an interior-facing "dry side" (FIG. 1B). Door assembly 10 includes an outer panel 12, inner panel 14 operably connected to outer panel 12 as to form a compartment therebetween, and at least one trim component 16. A plurality of components are mounted to door assembly 10, including a side mirror 18, latch assembly 20, speaker 22, inner handle assembly 24 (FIG. 2), outer handle assembly 26, electrical wiring harness 28, door hinges 30 and a window regulator motor 32 operable to power a window regulator (not shown) to raise or lower a window glass (also not shown). A set of hinges 33 are provided to operably connect door assembly 10 to a motor vehicle (not shown). The presently-illustrated door assembly 10 is frameless, but framed door assemblies are also within the scope of the invention.

Figure 3A:
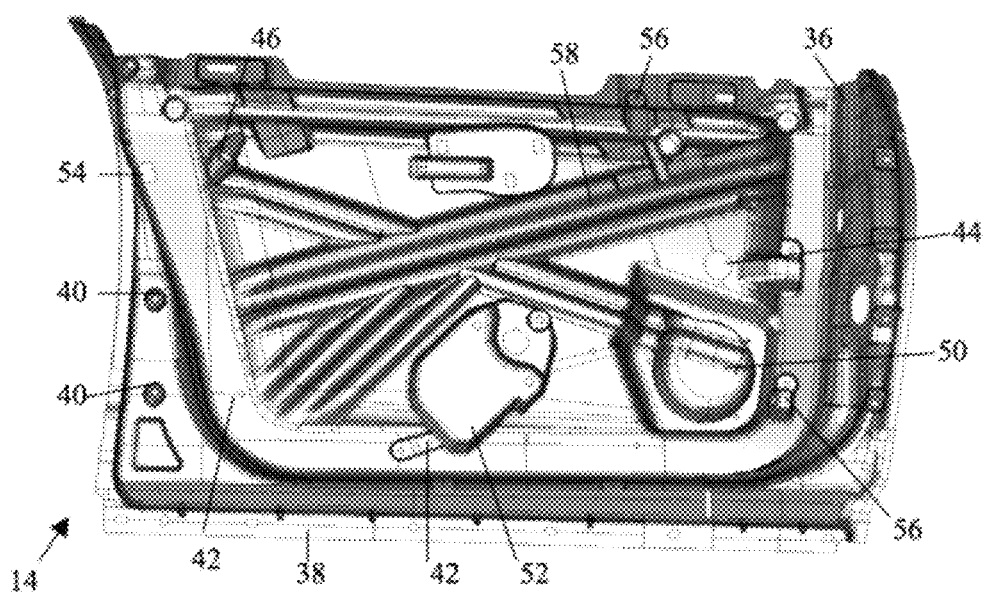
FIG. 3A is a perspective view of the wet side of an inner panel for the door assembly shown in FIGS. 1A and 1B.
Figure 3B:
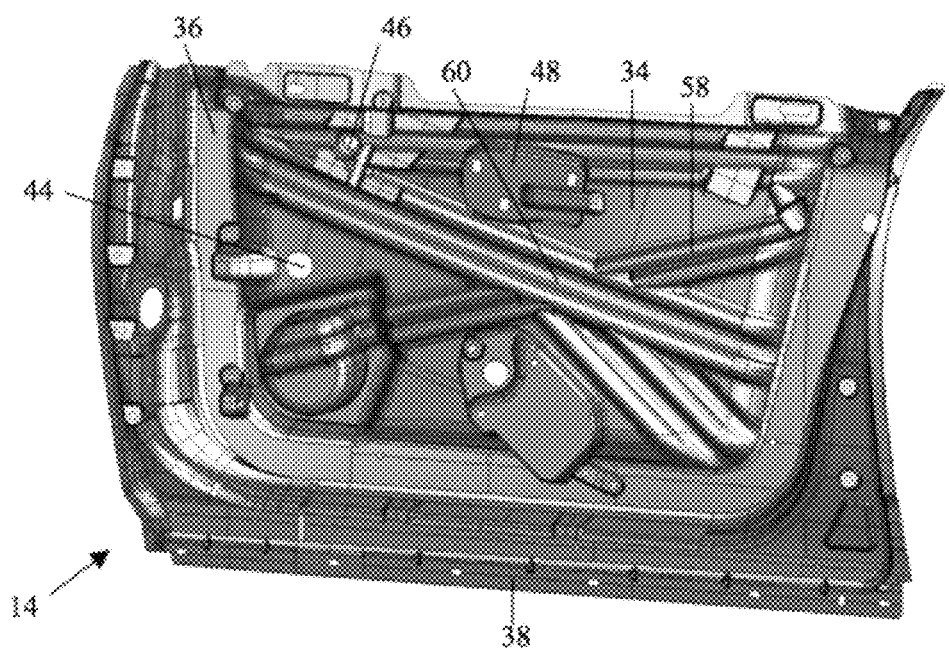
FIG. 3B is a perspective view of the dry side of the inner panel for the door assembly shown in FIGS. 1A and 1B.
Figure 4B:
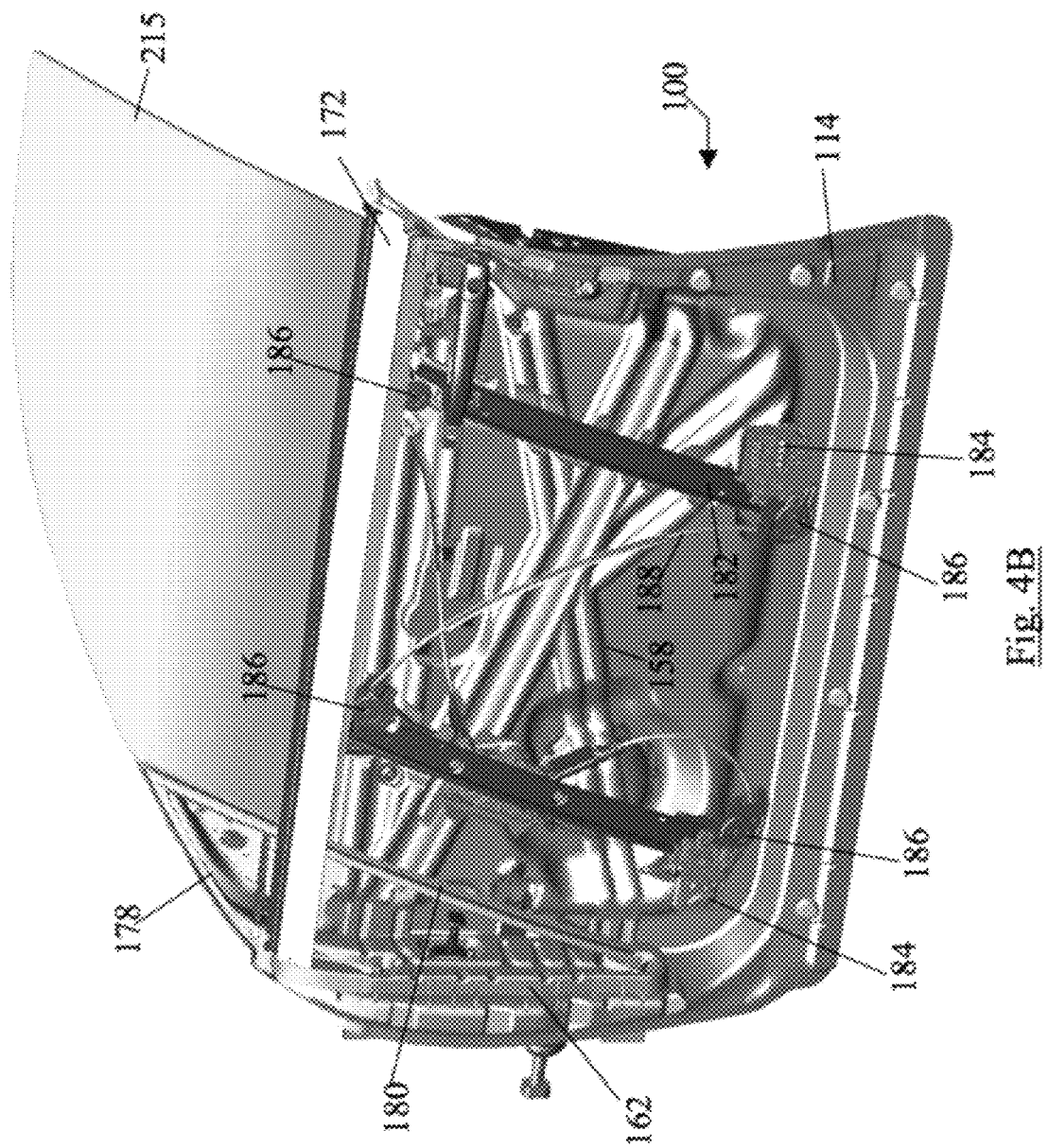

Outer panel 12 is shaped to present a streamlined and contoured exterior surface. Inner panel 14 provides a generally complementary contoured surface. Referring now to FIGS. 3A and 3B, inner panel 14 is described in greater detail. Inner panel 14 includes an inboard panel region 34 that is displaced away from the outer panel 12 by web portions 36 to form the compartment. A flange 38 is provided along the edges of inner panel 14 to provide a positive contact surface for bonding to outer panel 12 by welding, hemming, or fastening. Inner panel 14 is generally around 2 mm thick and is preferably manufactured from an aluminum-magnesium sheet stock such as AA 5083 H18, although other suitable alloys can be used.

Inner panel 14 includes a number of integrally-formed components operable to decrease the assembly time of door assembly 10 such as fastening locators 40 to assist in situating inner panel 14 relative to outer panel 12 and trim fastening locators 42 to assist in situating trim components 16 on inner panel 14. A wiring harness pass-thru 44 is provided to allow the passage of wiring harness 28, and a handle pass thru 46 is provided to allow the passage of a handle cable (not shown). On the dry side, inner panel 14 further includes a mounting surface 48 for an inner handle assembly (not shown), and a speaker housing 50. On the wet side, inner panel 14 includes a window regulator motor mounting surface 52, a latch attachment 54, and rail mounting surfaces 56 to locate the rails for a window regulator (not shown). Motor mounting surface 52 and rail mounting surfaces 56 are raised away from inboard panel region 34 towards outer panel 12. Other integrally-formed components for inner panel 14 will occur to those of skill in the art.

Inner panel 14 further includes at least one integral impact region 58. Each integral impact region 58 is a corrugated portion of the inner panel, comprising a series of ridges and troughs. Ridges on the wet side of inner panel 14 are troughs on the dry side, and troughs on the wet side are ridges on the dry side. Motor mounting surface 52 and rail mounting surface 56 extend closer towards outer panel 12 than the ridges of the impact regions 58 towards outer panel 12. Preferably, ridges facing the wet side are at least as far away from outer panel 12 as the surface of inboard panel region 34. Thus, packaging interference by the impact region 58 is minimized between the wet side of inner panel 14 and outer panel 12, allowing for a narrower compartment between outer panel 12 and inner panel 14. Preferably, inner panel 14 includes multiple impact regions 58 running non-parallel to each other to provide the maximum intrusion resistance from differing impact angles. Different impact regions 58 can have differing numbers of corrugations as to provide the desired level of intrusion resistance while still providing sufficient flat mounting surface area to meet door packaging requirements. In the currently illustrated embodiment, impact regions 58 bisect each other in region 52 to provide the maximum intrusion resistance at the preferred sitting position of the vehicle occupant. The impact regions 58 extend across a substantial length of inboard panel region 32 without interruption. While the intrusion resistance can vary in impact regions 58 based upon different design requirements, testing has shown that door assembly 10 with impact regions 58 can require approximately five times the side impact force to be displaced an equivalent distance in a conventional door.

According to the presently preferred embodiment of the invention, inner panel 14 is manufactured using combination of forming techniques. A blank is preheated (typically to a temperature between 450-550° C. and placed into a multi-piece stamping tool to form into an intermediary shape. The raw stock is generally 2-3 mm thick. Apertures such as wiring harness pass-thru 44 are removed from the sheet metal stock and the stock is pressed into a intermediate form subject to the limitations of stamping and the malleability of the stock.

After passing through the warm-forming stage, inner panel 14 is further formed by a super plastic forming operation (SPF). As known to those of skill in the art, the elasticity of alloys with a fine grain microstructure (such as aluminum AA 5083 H18) can increase up to several hundred percent when exposed to high heat and pressure. Under high heat (typically between 400-550° C.) and pressure, the stock is formed into the contoured shape of the mould at a controlled rate and pressure. Using SPF, a deeper draw can be achieved in the stock over typical stamping processes. By pre-heating and pre-stamping the stock, the time required to super-plastic form the final shape of inner panel 12 is reduced.

Door assembly 10 reduces the part count and weight while increasing the intrusion resistance over conventional doors. In addition, the location and angling of impact regions 58 provides for a thinner yet stiffer door than the prior art.

FIGS. 4A, 4B, 5A, 5B show a second embodiment of a door assembly 100, which includes an outer panel 112 and an inner panel 114, defining a compartment 113 therebetween. The inner panel 114 includes an integrated intrusion beam 158 comprising corrugated portions of the inner panel.

In this embodiment, a cavity 154 (seen best in FIG. 5B) is formed on the dry side of inner panel 114 for attachment of a latch 155 (seen best in FIG. 4A) thereto. A latch cover/reinforcement member 156 may also be optionally mounted to the inner panel 114. Locating the latch on the dry side of the inner panel 114 has a number of advantages, including eliminating access hole 54A of the first embodiment in order to gain access to the wet side of the inner panel, making it easier to install or bolt the latch to the panel. In addition, placing the latch 155 on the dry side eliminates the possibility of opening or tampering with the latch 155 by inserting a tool (such as a "slim jim") into the compartment 113 between the outer and inner panels 112, 114 through the top of the compartment 113 or window slot.

Door assembly 100 also includes a hinge reinforcement member 162 (seen best in FIG. 4B), which is preferably adhesively bonded to the wet side of the inner panel 114. An epoxy adhesive has been found suitable for this purpose. Hinges 130 (see FIG. 4A) are mounted to the inner panel 114 and the hinge reinforcement member 162.

A number of other components are bolted or otherwise fastened directly to the dry side of the inner panel 114. These include an inner door handle 124 wiring harness 128, and speaker 122 all of which are mounted to suitably shaped mounting surfaces on the inner panel 114.

The door assembly 100 of the second embodiment also employs a separate hardware carrier 170 (seen in isolation in FIG. 5A) that carries various hardware components, particularly, window regulator components described in greater detail below, for insertion as a unit into the compartment 113 between the outer and inner panels 112, 114. In the preferred embodiment, the carrier 170 includes a belt line reinforcement member 172 that is a structural component in that it partially bears the load of a side and/or frontal impact. The belt line reinforcement member 172 is bolted to the inner panel 114 at mounting locations 174A, 174B. Locating lugs 176 are preferably provided for aligning the carrier 170 relative to the inner panel.

The carrier 170 also carries a mirror flag 178, and an integral glass run channel 180. These components are pre-bolted to the preferred belt line reinforcement member 172.

The carrier 170 also holds many window regulator components. These include window regulator rails 182, which are pre-bolted to the preferred belt line reinforcement member 172, or otherwise to an alternative form of hardware carrier 170. The rails 182, in turn, carry window glass lifter plates 184, pulleys 186 and associated cables 188. In the illustrated embodiment (FIGS. 4 & 5), the only part of the window regulator motor assembly that is pre-connected to the window regulator is a cable drum 190 (seen best in FIG. 5A), which is situated on the wet side of the inner panel. The motor 132 and drive gear 192, and the electrical connections to the motor 132, are situated on the dry side of the inner panel 114, and a connection is made between the cable drum 190 and drive gear 192. More particularly, referring to the detail view of FIGS. 6A and 6B, the cable drum 190 is preferably disposed in a housing 194 that includes or incorporates a series of hollow core, snap fit, prongs 196. The inner panel 114 features a corresponding series of vias 198 (see FIG. 5A, 5B) for accommodating the passage of the prongs 196. The motor drive gear 192 is disposed in a housing 200 (FIG. 6B) which has a series of correspondingly situated mating receptacles 202. As the cable drum housing 194 is preferably mounted to one of the rails 182, which in turn are pre-mounted to the carrier 170 that is aligned on the inner panel 114, the drum is thus consistently aligned on the wet side of the inner panel 114. Hence, the assembler is able to easily align and interlock the cable drum housing 194 with the drive gear housing 200 utilizing the snap fit connection. In the process, an output shaft 204 of the drive gear 192 is mated to an internal gear 206 of the cable drum 190 via a shaft passageway 208 located in the inner panel 114. If desired, bolts (not shown) may be driven through the hollow prongs 196 to seat in the receptacles 202, thus mechanically affixing the cable drum housing 194 and the drive gear housing 200 to the inner panel 114. In this manner, the window regulator is easily installed and the components of the motor assembly seal the inner panel.

The cable drum 190 may be mounted in other ways within the scope of the invention. For example, the cable drum housing may be disposed on a web (not shown) connected to and disposed between the rails, thereby uniquely locating the cable drum within the compartment 113 between the outer and inner door panels.

In a variant of the carrier 170, shown in FIG. 7, carrier 170 holds an entire window regulator motor assembly 210, which is thus situated entirely on the wet side of the inner panel 114. The motor assembly 210 is ensconced within a small cavity 212 formed in or on the wet side of inner door panel, enabling the motor assembly 210 to be bolted to the inner panel at designated points thereat.

In either variant, the vehicle window glass 215 may be pre-installed to the carrier 170, and the whole unit inserted into the compartment 113 between the outer and inner door panels 112, 114. Alternatively, the lifter plates 184 may be snap-in lifter plates as known in the art per se in which, once the window regulator is installed into the door assembly, the window glass 215 is thereafter inserted into the lifter plates 184 via a snap-fit connection.

It will be seen from the foregoing that the second embodiment of the door assembly has no substantial openings or access holes therethrough, except for minor passageways to accommodate fasteners, wire passages or a drive-shaft. These minor openings do not substantially affect the rigidity or impact performance of the inner panel, and are easily sealed using plugs well known in the art per se.

The above-described embodiments are intended to be examples of the present invention and those skilled in the art may effect alterations and modifications thereto without departing from the spirit of the invention.

I claim:

1. A door assembly for a motor vehicle, including:
an outer panel forming at least a portion of the exterior surface of the vehicle door;
a unitary inner panel operably connected to the outer panel so that a compartment is formed therebetween, the inner panel having a wet side surface forming a wall of said compartment and an opposing dry side surface facing a passenger cabin, wherein the inner panel includes integrally formed corrugations for resisting deformation caused by a side impact; and
a window at least partially mounted in the compartment between the inner panel and the outer panel;
characterized in that the inner panel substantially seals against the outer panel to prevent the passage of moisture therepast, and in that the at least one hardware mounting surface is integrally formed from the inner panel and extends towards the outer panel.

2. A door assembly according to claim 1, including a carrier mountable into the compartment formed between the inner and outer panels, wherein the carrier holds components of a window regulator, the carrier being alignable with the inner panel to consistently position the window regulator components within said compartment in order to affix the window regulator components to designated positions on the inner panel.

3. A door assembly according to claim 2, wherein:
the carrier includes at least one window regulator rail affixed thereto, at least one pulley rotatably mounted to the at least one rail, at least one cable entrained about the at least one pulley and a cable drum operatively connected to the at least one cable, whereby the cable drum is disposed on the wet side surface of the inner panel; and a drive motor is disposed on the dry side surface of the inner panel, the drive motor having an output shaft connectable to the cable drum via an insubstantial opening in the inner panel.

4. A door assembly according to claim 3, wherein the drive motor and cable drum are connectable via a snap-fit connection, one of the drive motor and cable drum having a male part of the connection and the other having the female part of the connection, wherein the insubstantial opening permits passage of the male part of the connection to the female part of the connection.

5. A door assembly according to claim 4, including a cavity formed on the dry side surface of the inner panel; and a latch mounted within said cavity on the dry side surface of the inner panel.

6. A door assembly according to claim 2, wherein the carrier comprises a belt line reinforcement, and a window regulator rail is affixed to the belt line reinforcement.

7. A door assembly according to claim 6, including a mirror flag and a window glass run channel connected to the belt line reinforcement member.

8. A door assembly for a motor vehicle, including:
an outer panel;
an inner panel, operably connected to the outer panel so that a cavity is formed therebetween having a peripheral edge;

at least one hardware mounting surface integrally formed from the inner panel and extending towards the outer panel, each of the hardware mounting surfaces being operable to mount a hardware component between the inner and outer panels;

at least one integrally-formed impact region provided on the inner panel to strengthen the door assembly and increase the intrusion resistance of the door assembly during a collision, and where the at least one impact region is displaced at least as far away from the outer panel as the at least one hardware mounting surface.

9. The door assembly of claim 8, wherein the at least one impact region consists of a plurality of longitudinal corrugations that are displaced at least as far away from the outer panel as the remainder of the inner panel that does not constitute the at least one impact region.

10. The door assembly of claim 9, wherein the at least one impact region is a plurality of non-continuous impact regions spaced around the inner panel.

11. The door assembly of claim 10, wherein the longitudinal corrugations of each impact region are non-parallel to the longitudinal corrugations of each other impact region.

12. The door assembly of claim 11, wherein at least two impact regions of the plurality of impact regions bisect each other.

13. An inner panel for a door assembly having an outer panel and an inner panel, operably connected to the outer panel so that a cavity is formed therebetween having a peripheral edge; the inner panel comprising:

at least one hardware mounting surface integrally formed from the inner panel and extending towards the outer panel on the door assembly, each of the hardware mounting surfaces being operable to mount a hardware component between the inner and outer panels;

at least one integrally-formed impact region operable to strengthen the door assembly and increase the intrusion resistance of the vehicle door during a collision, and where the at least one impact region is displaced at least as far away from the outer panel as the at least one hardware mounting surface.

* * * * *